(12) United States Patent
Yanagawa et al.

(10) Patent No.: US 10,703,889 B2
(45) Date of Patent: Jul. 7, 2020

(54) INSULATED ELECTRIC WIRE AND INSULATING RESIN COMPOSITION

(71) Applicant: SUMITOMO ELECTRIC INDUSTRIES, LTD., Osaka-shi, Osaka (JP)

(72) Inventors: Nayu Yanagawa, Osaka (JP); Shigeyuki Tanaka, Osaka (JP); Taro Fujita, Osaka (JP); Shinya Nishikawa, Osaka (JP); Takumi Ooshima, Kanuma (JP); Hiroyuki Okawa, Kanuma (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 69 days.

(21) Appl. No.: 16/062,682

(22) PCT Filed: Oct. 4, 2017

(86) PCT No.: PCT/JP2017/036112
§ 371 (c)(1),
(2) Date: Jun. 15, 2018

(87) PCT Pub. No.: WO2018/074233
PCT Pub. Date: Apr. 26, 2018

(65) Prior Publication Data
US 2018/0371221 A1 Dec. 27, 2018

(30) Foreign Application Priority Data
Oct. 19, 2016 (JP) .................. 2016-204931

(51) Int. Cl.
| | |
|---|---|
| C08L 23/08 | (2006.01) |
| C08L 23/20 | (2006.01) |
| C08L 23/06 | (2006.01) |
| H01B 3/44 | (2006.01) |
| H01B 7/295 | (2006.01) |

(52) U.S. Cl.
CPC .......... *C08L 23/0869* (2013.01); *C08L 23/06* (2013.01); *C08L 23/0815* (2013.01); *C08L 23/20* (2013.01); *H01B 3/44* (2013.01); *H01B 3/441* (2013.01); *H01B 3/447* (2013.01); *H01B 7/295* (2013.01); *C08L 2201/02* (2013.01); *C08L 2201/08* (2013.01); *C08L 2203/206* (2013.01); *C08L 2205/025* (2013.01); *C08L 2205/03* (2013.01); *C08L 2205/06* (2013.01); *C08L 2207/062* (2013.01)

(58) Field of Classification Search
CPC .......... H01B 3/44; H01B 3/441; H01B 3/447; H01B 7/295; H01B 7/292; C08L 23/0815; C08L 23/04; C08L 23/06; C08L 23/20; C08L 2201/02; C08L 2201/08; C08L 2203/206; C08L 2205/025; C08L 2205/03; C08L 2205/06; C08L 2207/062; C08L 51/06; H01L 33/44; H01L 33/441; H01L 33/447; H01L 33/448; C09L 2207/062; C08F 255/02; C08F 255/023; C08K 5/02; C08K 5/09; C08K 5/18; C08K 5/13; C08K 5/3445; C08K 5/548; C08K 13/02; C09D 123/06; C09D 151/06; C09D 7/40
USPC ....................................................... 428/379
See application file for complete search history.

(56) References Cited

U.S. PATENT DOCUMENTS

| | | |
|---|---|---|
| 2004/0092666 A1 | 5/2004 | Kitano et al. |
| 2017/0004906 A1 | 1/2017 | Tanaka et al. |

FOREIGN PATENT DOCUMENTS

| | | | |
|---|---|---|---|
| CN | 1447836 A | 10/2003 | |
| JP | 2009-127040 A | 6/2009 | |
| WO | WO-2015/159788 A1 | 10/2015 | |
| WO | WO-2016027651 A1 * | 2/2016 | ............ C08K 5/03 |

OTHER PUBLICATIONS

ENGAGE 7467 Datasheet, accessed online Oct. 16, 2019.*
ENGAGE 8480 Datasheet, accessed online Oct. 16, 2019.*

* cited by examiner

*Primary Examiner* — Camie S Thompson
(74) *Attorney, Agent, or Firm* — Faegre Drinker Biddle & Reath LLP

(57) ABSTRACT

An insulated electric wire includes a conductor and an insulating layer covering an outer periphery of the conductor.
The insulating layer is formed of a crosslinked polymer of an insulating resin composition that contains
a resin component containing
  a first copolymer which is a copolymer of ethylene and an unsaturated hydrocarbon having 4 or more carbon atoms and which has a density of less than 0.88 g/cm$^3$,
  a second copolymer which is a copolymer of ethylene and an unsaturated hydrocarbon having 4 or more carbon atoms and which has a density of 0.88 g/cm$^3$ or more and less than 0.91 g/cm$^3$, and
  a third copolymer which is a copolymer of ethylene and an acrylic acid ester or a copolymer of ethylene and a methacrylic acid ester, or
  containing the second copolymer and the third copolymer,
  in which a content of the second copolymer is 40% by mass or more of a total content of the first copolymer and the second copolymer and 60% by mass or less of a total content of the first copolymer, the second copolymer, and the third copolymer, and
  a ratio represented by the total content of the first copolymer and the second copolymer: a content of the third copolymer (mass ratio) is 80:20 to 40:60, and
30 to 100 parts by mass of a flame retardant and 1 to 5 parts by mass of a crosslinking assistant relative to 100 parts by mass of the resin component.

2 Claims, No Drawings

US 10,703,889 B2

INSULATED ELECTRIC WIRE AND INSULATING RESIN COMPOSITION

TECHNICAL FIELD

The present invention relates to an insulated electric wire and an insulating resin composition. The present invention claims priority from Japanese Patent Application No. 2016-204931 filed on Oct. 19, 2016, and the entire contents of the Japanese patent application are incorporated herein by reference.

BACKGROUND ART

Heat-resistant cross-linked polyethylene insulated low-voltage electric wires for automobiles (hereinafter referred to as "AEXs") that satisfy 120-degree heat resistance of the JASO Standards (Japan Automobile Standards Organization) are heat-resistant insulated electric wires used in wiring in vehicles such as automobiles. Insulated electric wires and electric cables (hereinafter, electric cables may also be referred to as "insulated electric wires") used in wiring in vehicles are required to have good flexibility for ease of cable routing and space saving, and AEXs are also desired to have improved flexibility. As an insulated electric wire having good flexibility, for example, PTL 1 discloses an insulated electric wire including an insulating coating formed of a resin composition that contains, for example, a base resin containing a polypropylene resin, a propylene-α-olefin copolymer, and a low-density polyethylene resin, a metal hydrate, and a phenolic antioxidant, and a wire harness including the insulated electric wire.

Insulated electric wires for hybrid vehicles and electric vehicles that have been developed in recent years are required to include conductors having larger diameters so that a large current can be supplied. In order to manage an increase in the diameters of conductors, further improvements in flexibility are desirable. Furthermore, in order to manage generation of a large quantity of heat due to supply of a large current, improvements in heat resistance are desirable. PTL 2 discloses an insulating resin composition which enables production of an insulated electric wire that has flexibility and heat resistance good enough to meet the recent requirements described above and which can provide a sufficient water-cut-off performance (terminal water cut-off structure). The insulating resin composition contains a resin containing a first copolymer which is a copolymer of ethylene and an unsaturated hydrocarbon having 4 or more carbon atoms and which has a density of less than 0.88 g/cm$^3$, and a second copolymer which is a copolymer of ethylene and an acrylic acid ester or a copolymer of ethylene and a methacrylic acid ester at a ratio represented by the first copolymer: the second copolymer (mass ratio) of 100:0 to 40:60; and 30 to 100 parts by mass of a flame retardant and 1 to 5 parts by mass of a crosslinking assistant relative to 100 parts by mass of the resin. PTL 2 further discloses an insulated electric wire that includes an insulating layer formed of a crosslinked polymer of this insulating resin composition and that has good flexibility, heat resistance, and water-cut-off performance (terminal water cut-off structure).

CITATION LIST

Patent Literature

PTL 1: Japanese Unexamined Patent Application Publication No. 2009-127040
PTL 2: International Publication No. WO 2015/159788

SUMMARY OF INVENTION

Solution to Problem

A first embodiment of the present invention is an insulated electric wire including a conductor and an insulating layer covering an outer periphery of the conductor.

The insulating layer is formed of a crosslinked polymer of an insulating resin composition that contains
  a resin component containing
    a first copolymer which is a copolymer of ethylene and an unsaturated hydrocarbon having 4 or more carbon atoms and which has a density of less than 0.88 g/cm$^3$,
    a second copolymer which is a copolymer of ethylene and an unsaturated hydrocarbon having 4 or more carbon atoms and which has a density of 0.88 g/cm$^3$ or more and less than 0.91 g/cm$^3$, and
    a third copolymer which is a copolymer of ethylene and an acrylic acid ester or a copolymer of ethylene and a methacrylic acid ester, or
  containing the second copolymer and the third copolymer,
  in which a content of the second copolymer is 40% by mass or more of a total content of the first copolymer and the second copolymer and 60% by mass or less of a total content of the first copolymer, the second copolymer, and the third copolymer, and
  a ratio represented by the total content of the first copolymer and the second copolymer: a content of the third copolymer (mass ratio) is 80:20 to 40:60, and
  30 to 100 parts by mass of a flame retardant and 1 to 5 parts by mass of a crosslinking assistant relative to 100 parts by mass of the resin component.

A second embodiment of the present invention is
an insulating resin composition that contains
  a resin component containing
    a first copolymer which is a copolymer of ethylene and an unsaturated hydrocarbon having 4 or more carbon atoms and which has a density of less than 0.88 g/cm$^3$,
    a second copolymer which is a copolymer of ethylene and an unsaturated hydrocarbon having 4 or more carbon atoms and which has a density of 0.88 g/cm$^3$ or more and less than 0.91 g/cm$^3$, and
    a third copolymer which is a copolymer of ethylene and an acrylic acid ester or a copolymer of ethylene and a methacrylic acid ester, or
  containing the second copolymer and the third copolymer,
  in which a content of the second copolymer is 40% by mass or more of a total content of the first copolymer and the second copolymer and 60% by mass or less of a total content of the first copolymer, the second copolymer, and the third copolymer, and
  a ratio represented by the total content of the first copolymer and the second copolymer: a content of the third copolymer (mass ratio) is 80:20 to 40:60, and
  30 to 100 parts by mass of a flame retardant and 1 to 5 parts by mass of a crosslinking assistant relative to 100 parts by mass of the resin component.

DESCRIPTION OF EMBODIMENTS

Technical Problem

Although the insulated electric wire disclosed in PTL 2 has good flexibility, oil resistance thereof decreases. Thus, there is a problem in that the insulated electric wire is unlikely to be used in applications in which high oil resistance is required. Furthermore, in recent years, requirements for mechanical strength, such as tensile strength, of insulated electric wires have also become higher, and further improvements in mechanical strength have also been desired. Accordingly, it has been desired to develop an insulated electric wire that includes an insulating layer having not only good flexibility but also good oil resistance and mechanical strength such as tensile strength.

It is an object of the present invention to provide an insulated electric wire that includes an insulating layer having not only good flexibility but also good oil resistance and mechanical strength.

It is also an object of the present invention to provide an insulating resin composition capable of providing a layer (insulating layer) having not only good flexibility but also good oil resistance and mechanical strength.

Advantageous Effects of the Present Disclosure

The insulated electric wire of the first embodiment is an insulated electric wire that includes an insulating layer having high flexibility and good oil resistance and further having good mechanical strength such as tensile strength. By forming an insulating layer of an insulated electric wire, the insulating layer being formed of a crosslinked polymer of the insulating resin composition of the second embodiment, it is possible to produce an insulated electric wire that includes an insulating layer having not only high flexibility but also good oil resistance and mechanical strength. Accordingly, an insulated electric wire suitable for wiring in vehicles and the like, in particular, AEXs is provided.

Next, embodiments for carrying out the present invention will be described. The embodiments do not limit the scope of the present invention and can be modified without departing from the gist of the present invention.

The inventor of the present invention conducted extensive studies to achieve the above objects. As a result, it was found that an insulated electric wire having not only good flexibility that is substantially the same as those of existing insulated electric wires but also having good oil resistance and mechanical strength can be produced by forming an insulating layer formed of a crosslinked polymer of an insulating resin composition that contains, in the insulating resin composition disclosed in PTL 2, instead of the copolymer which is a copolymer of ethylene and an unsaturated hydrocarbon having 4 or more carbon atoms and which has a density of less than 0.88 g/cm$^3$, a copolymer which is a copolymer of ethylene and an unsaturated hydrocarbon having 4 or more carbon atoms and which has a density of 0.88 g/cm$^3$ or more and less than 0.91 g/cm$^3$, or a mixture of a copolymer which is a copolymer of ethylene and an unsaturated hydrocarbon having 4 or more carbon atoms and which has a density of less than 0.88 g/cm$^3$ and a copolymer which is a copolymer of ethylene and an unsaturated hydrocarbon having 4 or more carbon atoms and which has a density of 0.88 g/cm$^3$ or more and less than 0.91 g/cm$^3$. This finding led to the realization of the present invention.

A first embodiment of the present invention is an insulated electric wire including a conductor and an insulating layer covering an outer periphery of the conductor.

The insulating layer is formed of a crosslinked polymer of an insulating resin composition that contains
  a resin component containing
    a first copolymer which is a copolymer of ethylene and an unsaturated hydrocarbon having 4 or more carbon atoms and which has a density of less than 0.88 g/cm$^3$,
    a second copolymer which is a copolymer of ethylene and an unsaturated hydrocarbon having 4 or more carbon atoms and which has a density of 0.88 g/cm$^3$ or more and less than 0.91 g/cm$^3$, and
    a third copolymer which is a copolymer of ethylene and an acrylic acid ester or a copolymer of ethylene and a methacrylic acid ester, or
  containing the second copolymer and the third copolymer,
  in which a content of the second copolymer is 40% by mass or more of a total content of the first copolymer and the second copolymer and 60% by mass or less of a total content of the first copolymer, the second copolymer, and the third copolymer, and
  a ratio represented by the total content of the first copolymer and the second copolymer: a content of the third copolymer (mass ratio) is 80:20 to 40:60, and
  30 to 100 parts by mass of a flame retardant and 1 to 5 parts by mass of a crosslinking assistant relative to 100 parts by mass of the resin component.

A second embodiment of the present invention is an insulating resin composition that forms the insulating layer of the insulated electric wire of the first embodiment.

The conductor of the insulated electric wire of the first embodiment is made of a metal, such as copper or aluminum, and is in the form of a long line. The number of conductor may be one, or two or more.

The insulating layer of the insulated electric wire of the first embodiment is formed of a crosslinked polymer of the insulating resin composition (the second embodiment of the present invention) that contains the resin component containing the first copolymer, the second copolymer, and the third copolymer in the above particular composition range, and the flame retardant and the crosslinking assistant in the above particular ranges.

The first copolymer contained in the insulating resin composition is a polyolefin resin which is a copolymer of ethylene and an unsaturated hydrocarbon having 4 or more carbon atoms and which has a density of less than 0.88 g/cm$^3$. The insulating resin composition need not necessarily contain the first copolymer.

Examples of the polyolefin resin include ethylene-butene copolymers (EB) and ethylene-octene copolymers (EO). Commercially available products can be used as the first copolymer. Examples of EB include commercially available products such as ENGAGE 7467 (available from The Dow Chemical Company, density: 0.862), TAFMER DF610 (available from Mitsui Chemicals, Inc., density: 0.862), and TAFMER DF710 (available from Mitsui Chemicals, Inc., density: 0.870). Examples of EO include commercially available products such as ENGAGE 8842 (available from The Dow Chemical Company, density: 0.857).

The second copolymer is a polyolefin resin which is a copolymer of ethylene and an unsaturated hydrocarbon having 4 or more carbon atoms and which has a density of 0.88 g/cm$^3$ or more and less than 0.91 g/cm$^3$. The content of the second copolymer is 40% by mass or more of the total content of the first copolymer and the second copolymer. When the content of the second copolymer is less than 40% by mass of the total content of the first copolymer and the second copolymer, oil resistance is not sufficiently provided. In addition, the content of the second copolymer is 60% by mass or less of the total content of the first copolymer, the second copolymer, and the third copolymer (in the case where the first copolymer is not contained, the total content of the second copolymer and the third copolymer). At a content exceeding 60% by mass, a 2% secant modulus of elasticity of the crosslinked polymer exceeds 55 MPa, and good flexibility is not provided. Furthermore, it tends to be difficult to cause crosslinking of the resin to proceed efficiently, and the modulus of elasticity tends to decrease at a high temperature (for example, 150° C.).

Examples of the polyolefin resin of the second copolymer also include ethylene-butene copolymers (EB) and ethylene-octene copolymers (EO). Commercially available products can be used as the second copolymer. Examples of EO include commercially available products such as ENGAGE 8480 (available from The Dow Chemical Company, density: 0.902).

The third copolymer is selected from the group consisting of ethylene-acrylic acid ester copolymers and ethylene-methacrylic acid ester copolymers. Specifically, examples thereof include ethylene-methyl acrylate, ethylene-ethyl acrylate, ethylene-butyl acrylate, ethylene-methyl methacrylate, ethylene-ethyl methacrylate, and ethylene-butyl methacrylate.

Of these, ethylene-ethyl acrylate copolymers (EEA) are preferred from the viewpoint of flexibility and heat resistance. Accordingly, an embodiment in which the third copolymer is an EEA is provided as a preferred embodiment. Examples of the EEA that can be used include commercially available products such as REXPEARL A4250 (available from Japan Polyethylene Corporation, EA ratio: 25%), DFDJ6182, NUC-6510 (available from NUC Corporation, EA ratio: 23%), NUC-6520 (available from NUC Corporation, EA ratio: 24%), and DPDJ-6182 (available from NUC Corporation, EA ratio: 15%).

The content of the third copolymer satisfies a ratio represented by the total content of the first copolymer and the second copolymer: the content of the third copolymer (mass ratio) in the range of 80:20 to 40:60. Good flexibility is provided within this range. When the content of the third copolymer (mass ratio) is more than 60% by mass or less than 20% by mass of the total content of the first copolymer and the second copolymer, the 2% secant modulus of elasticity of the crosslinked polymer exceeds 55 MPa, and good flexibility is not provided.

To improve flame retardancy of the insulated electric wire, the insulating resin composition of the second embodiment contains a flame retardant. The content of the flame retardant in the insulating resin composition is 30 parts by mass or more and 100 parts by mass or less relative to 100 parts by mass of the resin component. When the content of the flame retardant is less than 30 parts by mass, sufficient flame retardancy is not provided.

In contrast, a content of the flame retardant exceeding 100 parts by mass is not preferred because mechanical strength of the insulating layer decreases.

Examples of the flame retardant include magnesium hydroxide, aluminum hydroxide, brominated flame retardants, antimony trioxide, antimony pentoxide, and zinc borate. These flame retardants may be used alone or in combination of two or more thereof. However, magnesium hydroxide and aluminum hydroxide require a high content in order to obtain sufficient flame retardancy, and often adversely affect properties, for example, decrease mechanical strength and degrade heat resistance. Thus, a brominated flame retardant and antimony trioxide are preferably used in combination as the flame retardant. In particular, 10 to 50 parts by mass of a brominated flame retardant and 5 to 25 parts by mass of antimony trioxide are preferably blended relative to 100 parts by mass of the resin component. A commercially available product such as SAYTEX 8010 can be used as the brominated flame retardant.

The content of the crosslinking assistant in the insulating resin composition of the second embodiment is 1 part by mass or more and 5 parts by mass or less relative to 100 parts by mass of the resin component. When the content of the crosslinking assistant is less than 1 part by mass, crosslinking does not proceed sufficiently, and mechanical strength of the insulating layer may decrease. In contrast, a content of the crosslinking assistant exceeding 5 parts by mass is not preferred because the crosslinking density increases excessively and hardness increases excessively, resulting in a decrease in flexibility. Examples of the crosslinking assistant include isocyanurates such as triallyl isocyanurate (TAIC) and diallyl monoglycidyl isocyanurate (DA-MGIC); and trimethylolpropane trimethacrylate. These crosslinking assistants may be used alone or in combination of two or more thereof. Of these, trimethylolpropane trimethacrylate is preferred in order to effectively achieve crosslinking.

Other components can be optionally added to the insulating resin composition of the second embodiment as long as the gist of the present invention is not impaired. Examples of the other components include a lubricant, a processing aid, a coloring agent, an antioxidant, and zinc oxide. Examples of the antioxidant include sulfur-containing antioxidants and phenolic antioxidants. Addition of the antioxidant is preferred because oxidation degradation of the resin can be effectively suppressed.

The insulating resin composition of the second embodiment is produced by kneading the above-described essential components and optional components. Various known means can be used as the kneading method. As a kneading machine, a single-screw extruder, a twin-screw extruder, a Banbury mixer, a kneader, a roll mill, and other known kneading machines can be used. For example, a method that includes performing pre-blending in advance by using a high-speed mixer such as a Henschel mixer or the like, and subsequently performing kneading by using the above-described kneading machine can also be employed.

The conductor included in the insulated electric wire of the first embodiment is covered with an insulating layer formed of a crosslinked polymer of the insulating resin composition of the second embodiment. The first embodiment includes a case where the conductor is directly covered and a case where the conductor is covered with another layer therebetween. An example of the insulating layer that covers the conductor with another layer therebetween is a sheath layer covering the outer side of a conductive layer that is formed on the outer side of an insulated electric wire.

In the production of the insulated electric wire of the first embodiment, the outer side of the conductor is directly covered with the insulating resin composition of the second embodiment, or the outer side of another layer covering the conductor is covered with the insulating resin composition of the second embodiment, and subsequently, crosslinking of the resin is performed. The covering with the insulating resin composition can be performed by various known means, such as typical extrusion molding of an insulated electric wire. For example, the covering can be performed by using a single-screw extruder having a cylinder diameter Φ of 20 to 90 mm with L/D=10 to 40.

An example of the method for crosslinking the resin is a method of irradiating the resin with an ionizing radiation. Examples of the ionizing radiation include high-energy electromagnetic waves such as X rays and γ rays, and particle beams. An electron beam is preferred from the viewpoint that, for example, irradiation can be performed with a relatively inexpensive apparatus and easily controlled, and a high energy is easily obtained.

The insulated electric wire of the first embodiment encompasses not only a single insulated electric wire that includes a conductor and an insulating layer covering the conductor but also a bundle of a plurality of such insulated electric wires. An example of the bundle of a plurality of such insulated electric wires is a wire harness used in wiring in automobiles. The type and structure of the insulated electric wire are not limited, and examples thereof include single wires, flat wires, and shielded wires.

EXAMPLES

First, materials used in Examples and Comparative Examples will be described below.
(Materials Used)
[Resin Composition]
  EEA: REXPEARL A4250 (available from Japan Polyethylene Corporation, EA ratio: 25%, MI: 5, denoted by "EEA1" in tables)
  EEA: REXPEARL A1150 (available from Japan Polyethylene Corporation, EA: ratio 15%, MI: 0.8, denoted by "EEA2" in tables)
  EO: ENGAGE 8180 (available from Dow Chemical Japan Ltd., density: 0.863, MI: 1, denoted by "EO1" in tables)
  EO: ENGAGE 8440 (available from Dow Chemical Japan Ltd., density: 0.897, MI: 6, denoted by "EO2" in tables)
  High-density polyethylene: NOVATEC HB530 (available from Japan Polyethylene Corporation, denoted by "HDPE" in tables)
  Flame retardant:
    Brominated flame retardant SAYTEX 8010
    Antimony trioxide
  Zinc oxide: zinc oxide Type 1
  Antioxidant
    SUMILIZER MB (available from Sumitomo Chemical Company, Limited.: sulfur-containing antioxidant)
    IRGANOX 1010 (available from BASF: hindered phenol antioxidant)
    IRGANOX PS-802 (available from BASF: sulfur-containing antioxidant)
  Lubricant: stearic acid
  Crosslinking assistant
    TD1500s (DIC Corporation: trimethylolpropane trimethacrylate)
  Processing aid: METABLEN A3000 (available from MITSUBISHI RAYON CO., LTD.: acrylic-modified PTFE)

[Electric Wire Structure]
  Conductor: 15 sq (sectional area 15 mm$^2$) Thirty element wires each having an outer diameter of 0.18 mm were stranded into a stranded wire, and nineteen stranded wires prepared in this manner were then stranded into a double-stranded structure. Outer diameter of conductor: 5.5 mm
  Insulating layer: 1.25 mm in thickness
  Outer diameter of insulated electric wire: 8 mm Experiment Each of the insulating resin compositions mixed at blend ratios shown in Tables 1 and 2 was extruded onto the conductor to form an insulating layer having the above thickness and covering the conductor. As a result, an insulated electric wire having the electric wire structure described above was obtained. The resin was crosslinked by being irradiated with a 180 kGy electron beam. Subsequently, the tensile strength Ts, tensile elongation El, and 2% secant modulus of elasticity (flexibility) of the insulated electric wire were measured and oil resistance of the insulated electric wire was evaluated by the following methods. Tables 1 and 2 show the results.

[Methods for Measuring Tensile Strength Ts and Tensile Elongation El] The tensile strength and the tensile elongation were measured in accordance with JIS C 3005, 4.16 (tensile properties of insulation and sheath). Tables 1 and 2 show the results. Regarding the tensile strength, 10.3 MPa or more was evaluated as acceptable. Regarding the tensile elongation, 150% or more was evaluated as acceptable.

[Method for Measuring 2% Secant Modulus of Elasticity]

A test piece having a length of 100 mm was pulled in the length direction at a tensile rate of 50 mm/min with a tensile tester, and a load at 2% elongation was determined. The load was then divided by a sectional area, and the result was multiplied by 50 to obtain a value of a 2% secant modulus of elasticity (MPa). When the value of the secant modulus of elasticity was less than 55 MPa, the test piece was evaluated as acceptable.

[Oil Resistance Test (Evaluation of Oil Resistance)]

The oil resistance test was conducted in accordance with ISO6722 method 2. Specifically, the evaluation was conducted as follows. A sample of 600 mm was prepared from the insulated electric wire prepared above, and the sample was immersed in gasoline or light oil specified in ISO1817 at 23±5° C. for 20 hours. Subsequently, the sample was taken out, and the surface of the sample was wiped off. The sample was dried at room temperature for 30 minutes, and the outer diameter of the insulated electric wire was then measured within five minutes. A rate of change in the outer diameter represented by formula (1) below was determined. A sample having a rate of change in the outer diameter of 15% or less was evaluated as acceptable.

Rate of change in outer diameter=(outer diameter after immersion−outer diameter before immersion)/(outer diameter before immersion)×100 (%)     (Formula 1)

TABLE 1

|  |  | Experiment 1 | Experiment 2 | Experiment 3 | Experiment 4 | Experiment 5 |
|---|---|---|---|---|---|---|
| EEA1 (EA25%) |  | 50 | 25 | — | — | 50 |
| EEA2 (EA15%) |  | — | 25 | 50 | 100 | — |
| EO1 (Density: 0.863) |  | 50 | 50 | 50 | — | 25 |
| EO2 (Density: 0.897) |  | — | — | — | — | 25 |
| HDPE |  | — | — | — | — | — |
| Flame | Brominated flame retardant | 20 | 20 | 20 | 20 | 20 |

TABLE 1-continued

|  |  | Experiment 1 | Experiment 2 | Experiment 3 | Experiment 4 | Experiment 5 |
|---|---|---|---|---|---|---|
| retardant | Antimony trioxide | 10 | 10 | 10 | 10 | 10 |
| Zinc oxide |  | 1 | 1 | 1 | 1 | 1 |
| Antioxidant | SUMILIZER MB | 1 | 1 | 1 | 1 | 1 |
|  | IRGANOX 1010 | 1 | 1 | 1 | 1 | 1 |
|  | IRGANOX PS-802 | 0.5 | 0.5 | 0.5 | 0.5 | 0.5 |
| Lubricant | Stearic acid | 0.5 | 0.5 | 0.5 | 0.5 | 0.5 |
| Processing aid |  | 2 | 2 | 2 | 2 | 2 |
| Crosslinking assistant |  | 3 | 3 | 3 | 3 | 3 |
| Tensile strength Ts (MPa) |  | 12.3 | 14.7 | 16.2 | 23.8 | 16.2 |
| Tensile elongation El (%) |  | 503 | 518 | 512 | 497 | 535 |
| 2% Secant modulus of elasticity (MPa) |  | 12.2 | 16.9 | 20.8 | 56.0 | 25.8 |
| Rate of change in outer diameter (%) in oil resistance test | Gasoline | Tearing of insulating layer | 25.3 | 24.8 | 12.7 | 14.6 |
|  | Light oil | Swelling Could not be measured | 28.1 | 26.3 | 15.4 | 14.8 |

TABLE 2

|  |  | Experiment 6 | Experiment 7 | Experiment 8 | Experiment 9 |
|---|---|---|---|---|---|
| EEA1 (EA25%) |  | 50 | — | 45 | 30 |
| EEA2 (EA15%) |  | — | — | — | — |
| EO1 (Density: 0.863) |  | — | — | 45 | 30 |
| EO2 (Density: 0.897) |  | 50 | 100 | — | — |
| HDPE |  | — | — | 10 | 40 |
| Flame retardant | Brominated flame retardant | 20 | 20 | 20 | 20 |
|  | Antimony trioxide | 10 | 10 | 10 | 10 |
| Zinc oxide |  | 1 | 1 | 1 | 1 |
| Antioxidant | SUMILIZER MB | 1 | 1 | 1 | 1 |
|  | IRGANOX 1010 | 1 | 1 | 1 | 1 |
|  | IRGANOX PS-802 | 0.5 | 0.5 | 0.5 | 0.5 |
| Lubricant | Stearic acid | 0.5 | 0.5 | 0.5 | 0.5 |
| Processing aid |  | 2 | 2 | 2 | 2 |
| Crosslinking assistant |  | 3 | 3 | 3 | 3 |
| Tensile strength Ts (MPa) |  | 19.4 | 24.0 | 13.6 | 15.2 |
| Tensile elongation El (%) |  | 521 | 533 | 498 | 444 |
| 2% Secant modulus of elasticity (MPa) |  | 52.6 | 99.1 | 22.8 | 139.5 |
| Rate of change in outer diameter (%) in oil resistance test | Gasoline | 11.3 | 8.5 | 21.5 | 12.4 |
|  | Light oil | 12.3 | 7.8 | 28.9 | 14.6 |

The results shown in Tables 1 and 2 show the following.

In Experiments 5 and 6, in which insulated electric wires were produced by using insulating resin compositions each containing EEA (third copolymer) and EO2 (second copolymer) having a density of 0.88 g/cm³ or more and less than 0.91 g/cm³ in the composition range of the second embodiment, the insulated electric wires each have a 2% secant modulus of elasticity of less than 55 MPa to exhibit good flexibility and have good oil resistance, and results of the oil resistance test also satisfy the standards. However, in Experiments 1 to 3, in which insulated electric wires were produced by using insulating resin compositions each of which does not contain EO2 and contains only EO1 having a density of less than 0.88 g/cm³ and EEA, the rate of change in the outer diameter exceeds 15%, or tearing of the insulating layer and swelling occur in the oil resistance test, showing low oil resistance. In Experiment 4, in which an insulated electric wire was produced by using an insulating resin composition containing EEA alone, and Experiment 7, in which an insulated electric wire was produced by using an insulating resin composition containing EO2 alone without containing EEA, the insulated electric wires each have a 2% secant modulus of 55 MPa or more and thus have poor flexibility.

Experiments 8 and 9 are cases where insulated electric wires were produced by using insulating resin compositions each containing EEA, EO1 having a density of less than 0.88 g/cm³, and HDPE. In Experiment 8, in which the composition ratio of HDPE is 10% by mass, the insulated electric wire has a rate of change in the outer diameter of 15% or more and thus has low oil resistance. In Experiment 9, in which the composition ratio of HDPE is 40% by mass, the insulated electric wire has a 2% secant modulus of elasticity of significantly higher than 55 MPa and thus has poor flexibility.

The invention claimed is:

1. An insulated electric wire comprising a conductor and an insulating layer covering an outer periphery of the conductor,
   wherein the insulating layer is formed of a crosslinked polymer of an insulating resin composition that contains
   a resin component containing
   a first copolymer which is a copolymer of ethylene and an unsaturated hydrocarbon having 4 or more carbon atoms and which has a density of less than 0.88 g/cm³,
   a second copolymer which is a copolymer of ethylene and an unsaturated hydrocarbon having 4 or more carbon atoms and which has a density of 0.88 g/cm$^3$ or more and less than 0.91 g/cm$^3$, and a third copolymer which is an ethylene-ethyl acrylate copolymer, or containing the second copolymer and the third copolymer, wherein a content of the second copolymer is 40% by mass or more of a total content of the first copolymer and the second copolymer and 60% by mass or less of a total content of the first copolymer, the second copolymer, and the third copolymer, and a ratio represented by the total content of the first copolymer and the second copolymer: a content of the third copolymer (mass ratio) is 80:20 to 40:60, and 30 to 100 parts by mass of a flame retardant and 1 to 5 parts by mass of a crosslinking assistant relative to 100 parts by mass of the resin component.

2. An insulating resin composition comprising:

a resin component containing a first copolymer which is a copolymer of ethylene and an unsaturated hydrocarbon having 4 or more carbon atoms and which has a density of less than 0.88 g/cm$^3$, a second copolymer which is a copolymer of ethylene and an unsaturated hydrocarbon having 4 or more carbon atoms and which has a density of 0.88 g/cm$^3$ or more and less than 0.91 g/cm$^3$, and a third copolymer which is an ethylene-ethyl acrylate copolymer, or containing the second copolymer and the third copolymer, wherein a content of the second copolymer is 40% by mass or more of a total content of the first copolymer and the second copolymer and 60% by mass or less of a total content of the first copolymer, the second copolymer, and the third copolymer, and a ratio represented by the total content of the first copolymer and the second copolymer: a content of the third copolymer (mass ratio) is 80:20 to 40:60; and 30 to 100 parts by mass of a flame retardant and 1 to 5 parts by mass of a crosslinking assistant relative to 100 parts by mass of the resin component.

* * * * *